Figure 1:
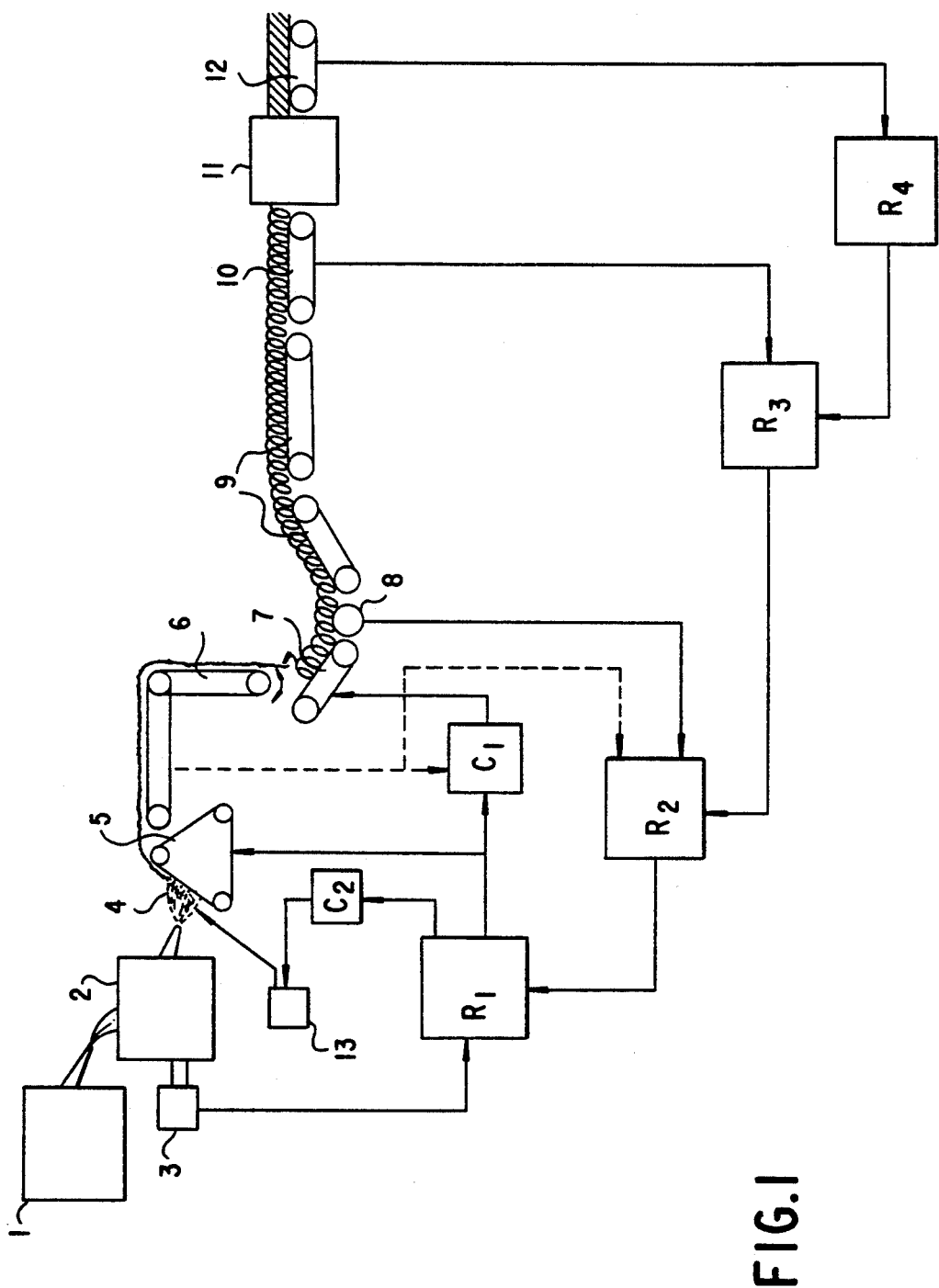

United States Patent [19]

Holmström

[11] Patent Number: 5,324,338

[45] Date of Patent: Jun. 28, 1994

[54] METHOD FOR REGULATING A WEIGHT RELATED PARAMETER OF A MINERAL FIBRE FELT

[75] Inventor: Kjell E. Holmström, Pargas, Finland

[73] Assignee: PAROC Oy Ab, Pargas, Finland

[21] Appl. No.: 949,637

[22] PCT Filed: Jun. 12, 1991

[86] PCT No.: PCT/FI91/00186

§ 371 Date: Feb. 3, 1993

§ 102(e) Date: Feb. 3, 1993

[87] PCT Pub. No.: WO91/19684

PCT Pub. Date: Dec. 26, 1991

[30] Foreign Application Priority Data

Jun. 13, 1990 [FI] Finland ................... 902967

[51] Int. Cl.$^5$ ................................ C03B 37/04
[52] U.S. Cl. ................................ 65/4.4; 65/8; 156/62.4; 222/55
[58] Field of Search ............ 65/2, 4.4, 5, 9, 8, 65/14, 29, 163; 222/55; 156/62.4

[56] References Cited

U.S. PATENT DOCUMENTS

| 4,210,432 | 7/1980 | Brelén et al. | 65/4.4 |
| 4,240,815 | 12/1980 | Brelen et al. | 65/2 |
| 4,582,520 | 4/1986 | Sturm | 65/29 X |
| 4,592,769 | 6/1986 | Lemaignen | 65/4.4 |

FOREIGN PATENT DOCUMENTS

2729146  4/1985  Fed. Rep. of Germany.

Primary Examiner—Robert L. Lindsay
Attorney, Agent, or Firm—Armstrong, Westerman, Hattori, McLeland & Naughton

[57] ABSTRACT

Method for regulating a weight related parameter in a mineral fibre felt, in mineral fibre production. The speed of the fibre felt is regulated by a feed-forward connected regulator ($R_1$) based on the power consumption of the fiberizing unit (2). The regulator ($R_1$) is corrected with a feed-back connected regulator ($R_2$) wherein the measured signal is a weight related parameter measured at a location in the beginning of the felt forming line. The regulator ($R_2$) in turn is corrected by a third feedback connected regulator ($R_3$) wherein the measured signal is a weight related parameter measured at a point at the end of the felt forming line.

7 Claims, 1 Drawing Sheet

METHOD FOR REGULATING A WEIGHT RELATED PARAMETER OF A MINERAL FIBRE FELT

The invention concerns, in mineral felt production, a method for regulating a weight related parameter in the mineral fibre felt, by continuously adjusting the speed of the formed felt to the fibre flow from a fiberizing unit. The speed of the conveyors for the fibre felt are regulated by a first, feed-forward connected regulating device, wherein the measured value consists of the power consumption of the drive means for the fiberizing unit. This first regulating device is corrected by a second, feed-back connected regulating device, wherein the measured value consists of a weight related parameter of the fibre felt and this second regulating device is corrected in turn by a third feed-back connected regulating device wherein the measured value also consists of a weight related parameter of the fibre felt.

Mineral wool products are manufactured e.g. so that the necessary raw material is melted in a melting furnace, mineral melt is continuously withdrawn from the furnace through a discharge opening and converted to fibres in a fiberizing unit, which can e.g. consist of a plurality of rotating wheels, from which the mineral melt is slung under the formation of fibres. The thus formed fibres are transported by means of an air current from the fiberizing unit and are collected onto a conveyor in the form of a fibre felt. This felt can be of the desired final thickness, or form a so called primary web consisting of a thin layer of fibres, which thereafter are laid one on top of the other to form a secondary felt of the desired thickness, e.g. folded by means of a pendulum conveyor.

At some stage of manufacture, a suitable binder is added to the fibres, e.g. a resin, which at a final stage of the processing of the fibre felt is activated e.g. by heat. Thereby the fibres are fixed to each other under the formation of a form stable felt of the desired density and thickness, which thereafter is shaped to form the desired product.

The manufactured fibre felt should naturally exhibit as few as possible variations as to its structure, especially to its weight such as the weight of manufactured felt per time or length unit, its density and/or surface weight. This is achieved by maintaining the melt mass flow from the dicharge opening of the furnace as constant as possible and by regulating the speed of the fibre processing line following the fiberizing unit.

The speed of the fibre processing line is regulated on the basis of variations in the melt flow, which result in variations in the power consumption of the fiberizing unit, and on the basis of a weight related parameter of the fibre felt.

The invention is characterized in that a weight related parameter of the fibre felt, for example the surface weight of the fibre felt, is measured at least at two locations of the fibre felt. One of the locations is situated in the beginning of the felt forming line or procedure, where the felt has not necessarily yet been stabilized, and the second location is situated at the end of the felt forming line where the felt certainly has been stabilized, suitably somewhat before curing. The value which is measured in the beginning of the felt line is, over a second regulating device, used to carry out a correction on the first regulating device that regulates the speed of the conveyors. Obtaining a measurement result at an early stage, preferably as close as possible after the pendulum conveyor, makes it possible to carry out a rapid or immediate corrective regulation of the process system. Due to the fact that the felt has not stabilized itself completely at this point, this immediate measurement signal is not completely reliable. Although it reflects fairly well relative changes in the felt, the absolute level is not quite reliable and thus a second measurement signal is needed to correct the first one. According to the invention this second point of measurement is located at a distance from the first point of measurement, where the felt has been stabilized. This measured value from the later part of the fibre felt is in turn feed-back connected, over a third regulating device, to perform a correction of the second regulating device. Preferably the measurement takes place with the felt in a horizontal position which provides for more accurate measurement. It is also possible to measure over a bigger area. This second measurement then provides for a slower corrective regulation of the process system, i.e. a fine adjustment, or level correction, of the system.

It is also advantageous to measure a weight related parameter of the fibre felt after curing when the fibre felt has obtained its final characteristics. This measured value is connected over a fourth, feed-back connected regulating device to correct the third regulating device.

An advantageous mode of the invention is described in the following with reference to the appended drawing, wherein: FIG. 1 shows an outline diagram of an apparatus for the manufacture of a fibre felt.

In the outline diagram according to FIG. 1, melt is withdrawn from a furnace 1 and led to a conventional fiberizing unit 2 where the melt hits spinning wheels and is slung under the influence of the centrifugal force while forming fibres. The fiberizing unit 2 is driven by a suitable drive means 3, for example an electrical motor, the power of which can easily be measured. The power consumption of the drive means 3 of the fiberizing unit 2 is monotonously dependant on the melt mass flow fed to the fiberizing unit 2 and forms thus a suitable initial parameter for regulating the speed of the conveyors for the fibre felt in order to produce the desired mineral fibre felt from the given raw materials.

From the fiberizing unit 2 the formed fibres 4 are pulled by underpressure towards a belt conveyor 5 and form a relatively thin primary fibre web. From the belt conveyor the primary fibre web is transported to a pendulum conveyor 6 which folds the thin primary fibre web to a secondary fibre felt of the desired thickness on a belt conveyor 7. Herefrom the secondary fibre felt is transported further over a roll 8 to a conveyor 9 and finally over a conveyor 10 to a curing oven 11. At a suitable location prior to the curing oven, a suitable binder, e.g. a resin, is added to the fibres, which resin during the heat treatment in the oven fixes the fibres to each other to form a form stable fibre felt of the desired density and thickness.

The conveyors between the fiberizing unit 2 and the curing oven 11 are divided into two speed zones so that the conveyors 5 and 6 in the first speed zone are driven at one speed, and the conveyors 7, 9 and 10 and the roll 8 in the second speed zone are driven at a different speed The speed of the conveyors in the first zone is substantially higher than in the second zone. In the first speed zone the primary web is formed and in the second zone the secondary felt is formed. The speed ratio between the zones is determined by a suitable function $C_1$.

The basic adjustment of the speed of the conveyors is set on the basis of the power measured at the drive means 3 of the fiberizing unit 2. The measured value for the power is fed to a feed-forward connected regulator $R_1$ which controls the adjustment of the speed of the conveyors in both speed zones. The feed-forward connected regulator $R_1$ suitably operates according to a mathematical function which is predetermined for a given raw material and desired fibre felt, where, for example, mass per time unit is a function of the power of the drive means 3.

For fine adjustment of the regulation of the speed of the conveyors based on the actual characteristics of the fibre felt obtained during operation, suitably a weight related parameter, for example the weight of the fibre felt per length, surface or volume unit, on the roll 8 after the pendulum conveyor 6 is measured and this mesured value is feed-back connected over a regulator $R_2$ to the regulator $R_1$ in order to correct the output signal from the feed-forward connected regulator $R_1$. The corresponding weight related parameter of the fibre felt is also measured at the conveyor 10, i.e. before the curing oven 11, and this measured value is feed-back connected over a regulator $R_3$ to the feed-back connected regulator $R_2$ in order to correct the output signal of the regulator $R_2$. The regulator $R_2$, the measured signal of which is formed by a weight related parameter of the fibre felt in an early stage when the fibre web is being folded or has just been folded to the desired thickness and passes the roll 8, thus functions as a fast dynamic feed-back connection. On the conveyor 10 the fibre felt has, however, already stabilized itself, whereby the regulator $R_3$ functions as a slower and more static feed-back coupling. Further, the measurement of the weight related parameter of the fibre felt takes place in a more exact manner on the conveyor 10 as the measurement can be carried out on a longer length of the fibre felt than at the roll 8.

This combination, where a weight related parameter of the fibre felt is measured at an early stage at or immediately after the pendulum conveyor 6 and at a later stage before the curing oven 11 and these measured values are used to correct the speed adjustment of the fibre felt conveyors in the above described manner, results in a good and even quality in the end product.

By measuring a further weight related parameter of the fibre felt on the conveyor 12 after the curing oven 11 one obtains a measured value which represents well the weight related characteristics of the end product. This measured value is then connected over a feed-back connected regulator $R_4$ to the feed-back connected regulator $R_3$, in order to correct its output signal.

The measured value for the regulator $R_4$ can also be obtained by measuring a weight related parameter of the final product, for example by weighing a package of cut mineral fibre sheets.

According to an additional embodiment, the first regulating device $R_1$ may be feed-forward connected, over a further calculator $C_2$, to suitable dosing means 13 for adjusting, based on the power consumption of the fiberizing unit 2, the amount of additive to be added to the mineral fibres after the fiberizing unit at 4.

As an alternative to measuring a weight related parameter of the fibre felt on the roll 8, a weight related parameter of the primary fibre web can be measured immediately after the fiberizing unit 2, for example on the conveyor 5, and this measured value can be coupled to the regulator $R_2$ which is indicated with a broken line in FIG. 1.

The weight related parameter from the conveyor 5 can also be re-calculated to represent the fibre flow and be used instead of the regulator $R_1$ for feed-forward control of the conveyors in the second speed zone.

The weight related parameter of the fibre felt can be measured with a suitable weighing device, e.g. a belt weighing device, but it is also possible to use optical measurement.

I claim:

1. Method for regulating a weight related parameter in a mineral fibre felt, by continuously adjusting the speed of the formed felt to the fibre flow from a fiberizing unit (2), whereby the speed of the conveyors for the fibre felt are regulated by a first, feed-forward connected regulating device ($R_1$), wherein the measured value consists of the power consumption of the drive means (3) for the fiberizing unit (2), this first regulating device ($R_1$) is corrected by a second, feed-back connected regulating device ($R_2$), wherein the measured value consists of a weight related parameter of the fibre felt and this second regulating device ($R_2$) is in turn corrected by a third feed-back connected regulating device ($R_3$), wherein the measured value consists of a weight related parameter of the fibre felt as well, characterized in that the measured value for the second regulating device ($R_2$) is measured at a location in the beginning of the felt forming line, before the felt has stabilized itself, and the measured value for the third regulating device ($R_3$) is measured at a location at the end of the felt forming line, where the felt has stabilized itself.

2. Method according to the claim 1, characterized in that the weight related parameter of the fibre felt which is used in the second regulating device ($R_2$) is measured at a location of the fibre felt at or immediately after a pendulum conveyor (6) which folds the fibre felt substantially to its final thickness.

3. Method according to the claim 2, characterized in that the weight related parameter of the fibre felt which is used in the second regulating device ($R_2$) is measured on a roll apparatus (8) situated after the pendulum conveyor (6).

4. Method according to the claim 1, characterized in that the weight related parameter of the fibre felt which is used as the measured value in the second regulating device ($R_2$) is measured at a location of the fibre felt immediately after the fiberizing unit (2).

5. Method according to any one of the claims 1 to 3, characterized in that the weight related parameter of the fibre felt which is used as a measured value in the third regulating device ($R_3$) is measured at a location at the end of the fibre felt before the curing (11) thereof.

6. Method according to any one of the claims 1 to 3, characterized in that the third, feed-back connected regulating device ($R_3$) is corrected by a fourth, feed-back connected regulating device ($R_4$), wherein the measured value is a weight related parameter of the final fibre felt measured after the curing (11) thereof.

7. Method according to any one of the claims 1 to 3, characterized in that the amount of additive to be added to the fibres (4) is regulated by the first regulating device ($R_1$) based on the measured power consumption of the drive means (3) for the fiberizing unit (2).

* * * * *